June 26, 1934. A. G. BRACKENBURY 1,964,029
FLUID PRESSURE BRAKE CYLINDER
Filed June 1, 1931   2 Sheets-Sheet 1
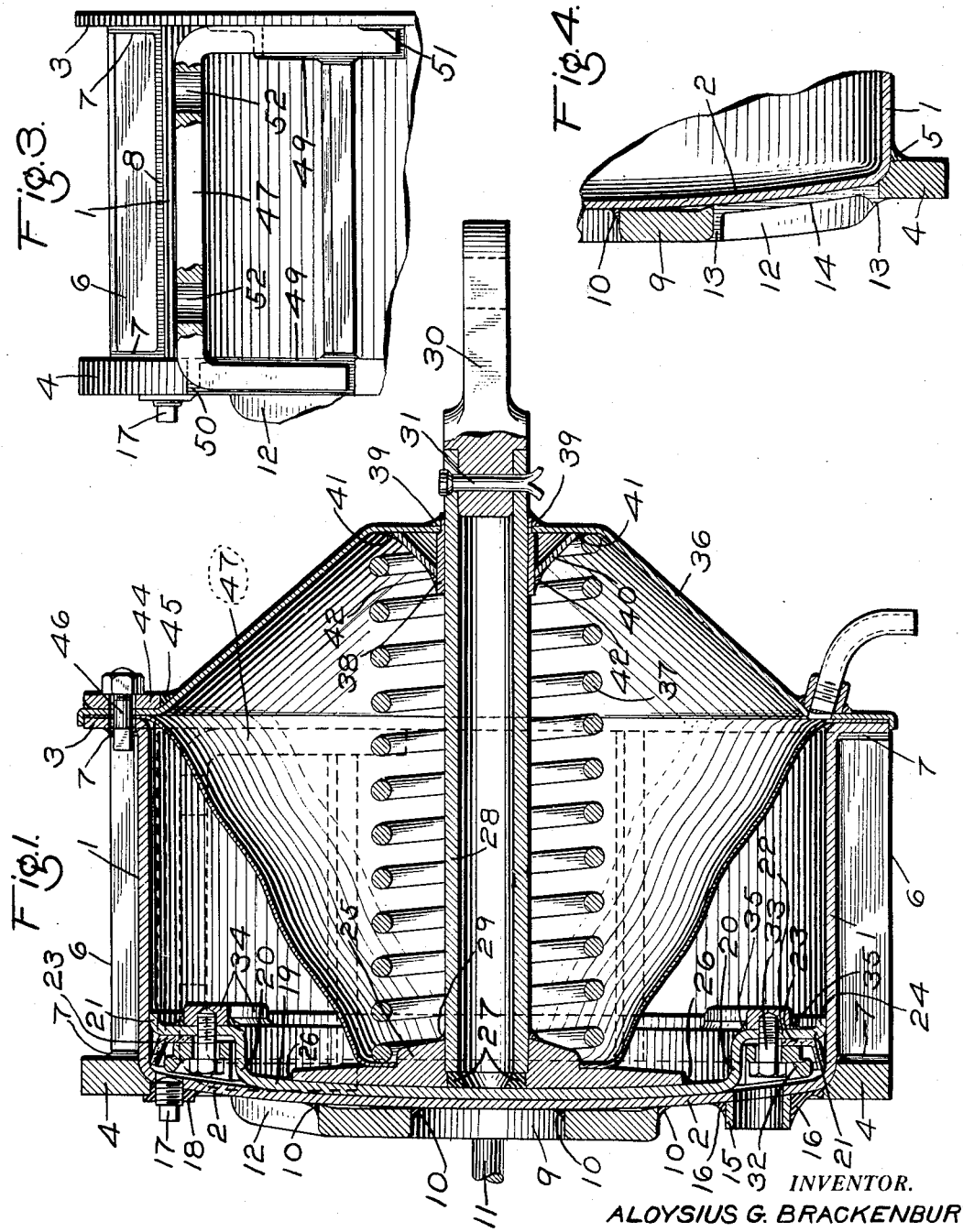
INVENTOR.
ALOYSIUS G. BRACKENBURY
By Wm. M. Cady
ATTORNEY.

June 26, 1934.  A. G. BRACKENBURY  1,964,029
FLUID PRESSURE BRAKE CYLINDER
Filed June 1, 1931   2 Sheets-Sheet 2
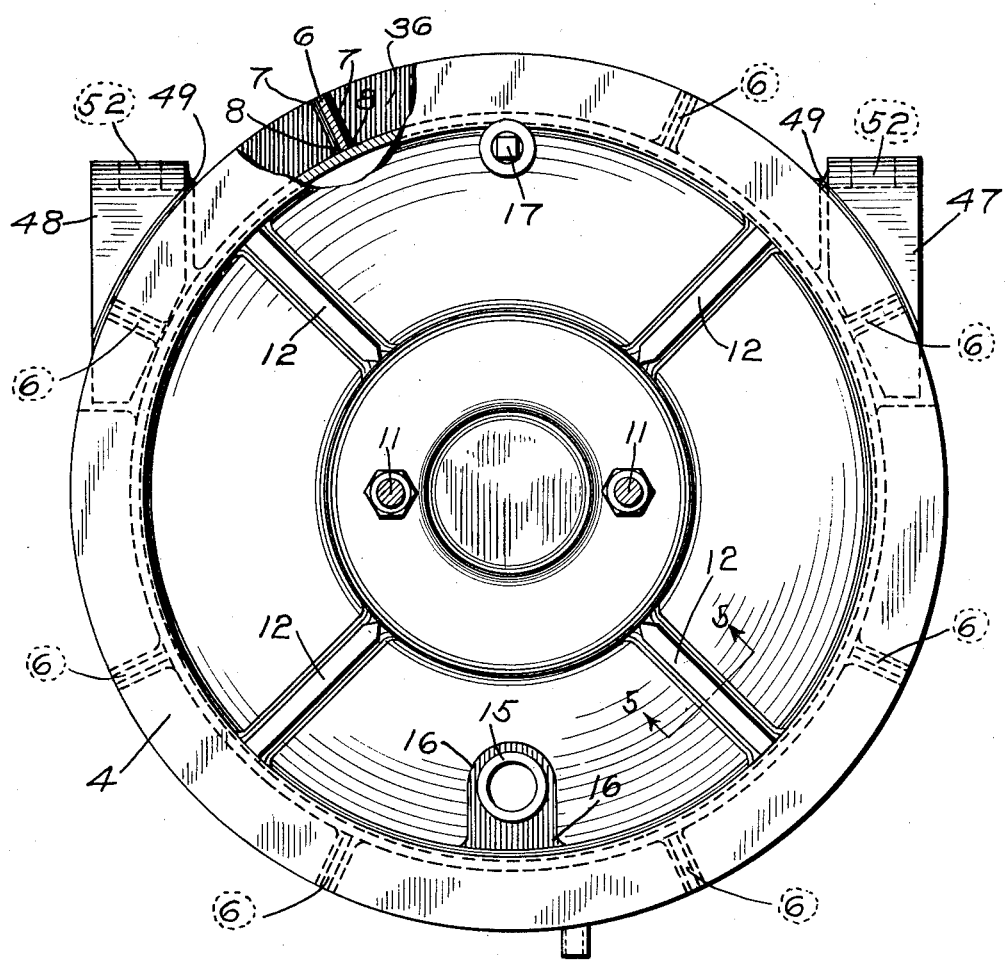
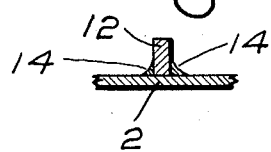
INVENTOR.
ALOYSIUS G. BRACKENBURY
By  Wm. M. Cady
ATTORNEY.

Patented June 26, 1934

1,964,029

UNITED STATES PATENT OFFICE 1,964,029

FLUID PRESSURE BRAKE CYLINDER

Aloysius G. Brackenbury, King's Cross, London, England, assignor to The Westinghouse Air Brake Company, Wilmerding, Pa., a corporation of Pennsylvania Application June 1, 1931, Serial No. 541,322
In Great Britain September 17, 1930

1 Claim. (Cl. 309—1)

This invention relates to brake cylinders and the like adapted to be operated by compressed air and has for its object to provide an improved construction of cylinder of this character.

It has hitherto been customary to construct cylinders for compressed air brake equipment of cast iron, the cylinder and cylinder head being of suitable form and transverse thickness to provide the necessary rigidity and strength to resist the stresses involved due to the internal air pressure.

Apart from certain limitations as regards form which are imposed by economical considerations associated with casting this material, cast iron, having an average tensile strength of approximately 16,000 pounds per square inch as compared with an average compressive strength of approximately 95,000 pounds per square inch, evidently necessitates a structural form of brake cylinder determined by these characteristic qualities.

In general, both as regards convenience and economy in casting and owing to the high compressive strength of cast iron, it is unnecessary to depart materially from a simple cylindrical form in the case of a cast iron brake cylinder, since a thickness of cylinder wall which is sufficient to withstand the tensile stress involved due to internal fluid pressure will, in the case of a cylinder of the usual proportions, be sufficient to provide the necessary rigidity in other respects.

The weight of a cast iron cylinder designed in accordance with the considerations above indicated is, however, very considerable, relative to its cubic capacity and the internal pressure it is adapted to withstand, and the present invention proposes to utilize as the material of which the cylinder is composed mild steel having a tensile strength which is approximately 80,000 pounds per square inch and a compressive strength which is only slightly less.

It will be appreciated that the thickness of the cylinder wall and head when composed of such steel may be reduced to a fraction of that required for a cast iron cylinder adapted for the same internal pressure conditions, with a corresponding advantage as regards amount and weight of material, but in order to ensure the necessary rigidity in view of the relatively thin cylinder wall and the somewhat lower compressive strength of the material, the simple cylindrical form must in certain respects be departed from and modified.

According to the principal feature of the present invention, the cylinder proper, which is preferably formed integral with the pressure head from a single piece of relatively thin sheet steel by a pressing operation, is re-inforced by external stiffening and strengthening members forming a skeleton structure or cage in such a manner that the stresses due to the internal fluid pressure acting on the cylinder wall other than pure tensile stresses are transmitted to and resisted by the reinforcing structure.

The invention is illustrated by way of example in the accompanying drawings, of which Figure 1 is a view in longitudinal section of a brake cylinder for compressed air braking apparatus with its co-operating piston constructed in accordance with one form of the invention; Figure 2 is a face view of the pressure head; Figure 3 is a view of a portion of the brake cylinder in side elevation; Figure 4 is a sectional view of a portion of the pressure head of the cylinder; and Figure 5 is a section on the line 5—5 of Fig. 1.

Referring now to the drawings, it will be seen that the cylinder proper 1 and its pressure head 2 are formed in one piece by a pressing operation from sheet steel of suitable transverse uniform thickness, the cylinder 1 after the pressing operation is completed being of true cylindrical form both externally and internally, the pressure head 2 being however, slightly dished or domed outwards. The other end of the cylinder is formed as an outwardly extending flanged rim 3 so that the cylinder is of substantially cup-like form. In order to obtain the necessary rigidity at the pressure head end of the cylinder a reinforcing ring 4 is secured by welding as indicated at 5 to the outer periphery of the cylinder 1 adjacent to the pressure head 2, the ring 4 being substantially of the same external diameter as that of the flange 3 at the opposite end of the cylinder. Extending longitudinally between the reinforcing ring 4 and the flange 3 are a number of ribs or bars 6 of sheet steel secured at their ends by welding as indicated at 7 to the reinforcing ring 4 and the flange 3 respectively and similarly secured at their inner edges as indicated at 8 to the exterior of the wall of the cylinder 1, the ribs 6 being thus radial to the cylinder axis as regards their transverse dimensions.

The outer face of the pressure head 2 of the cylinder is provided with an annular reinforcing member 9 secured to the head 2 by welding as indicated at 10, the member 9 serving not only to stiffen the head but also as a support for the usual bracket (not shown) carrying the brake lever, this bracket being secured in position by stud bolts 11.

Extending radially from the annular member 9 to the reinforcing ring 4 are a number of ribs or bars 12 which are welded at their ends as indicated at 13 to the ring 4 and the member 9 respectively, the base of each rib or bar 12 being welded as indicated at 14 to the outer face of the pressure head 2.

The head 2 is provided with a pipe connection or socket 15 secured to the head by welding as indicated at 16 and with a removable plug 17 mounted in a boss 18 formed by welding.

The piston co-operating with the cylinder is also formed from sheet steel by a pressing operation and comprises a disc 19 domed to conform with the interior of the pressure head 2. The periphery of the disc 19 is bent over in an axial direction at two different adjacent diameters as indicated at 20, 21, so as to form a double flange of which the inner flange 22 forms a seating for the piston packing 23 while the outer flange 24 forms a guide surface in contact with the wall of the cylinder 1.

The disc 19 is provided with a pressed steel piston head 25 which is welded externally and internally as indicated at 26, 27 to the disc 19, a tubular piston rod 28 fitting within a suitable socket aperture in the piston head 25 and being secured thereto by welding at 29. The opposite end of the piston rod 28 is provided with a cross head 30 for connection to a brake lever and secured to the piston rod by a split pin 31.

The piston packing 23 which is of substantially L cross sectional form is secured in position on the flange 22 by an annular guard member 32 secured by means of stud bolts 33 screw-threaded into blind bolt caps 34 welded as indicated at 35 to the outer face of the flange 22 so that any leakage of air past the bolts 33 is prevented. The outer end of the cylinder is closed by a cover 36 of substantially conical form secured to the flange 3 of the cylinder, this form of cover having the advantage that the sheet metal of which it is composed is subject to tensile stresses only under the action of the release spring 37 which surrounds the piston rod 28 and is interposed between the piston head 25 and the cover 36 in the usual manner. The central portion of the cover 36 is provided with a cylindrical piston rod bushing 38 preferably formed of suitable rustless steel alloy, the bushing 38 being welded to the cover 36 as indicated at 39 and secured in position by an internal conical strut member 40 welded to the cover 36 as indicated at 41 and to the bushing 38 as indicated at 42.

The cover 36 is provided adjacent to its periphery with a number of concentrically arranged reinforcing washers 44 welded to the external surface of the cover 36 as indicated at 45, the bolts 46 for securing the cover to the cylinder flange 3 passing through the washers 44 which also serve to prevent any risk of deformation of the cover 36 in the event of the flange 24 of the piston disc 19 coming into contact with the cover 36 at the end of a full stroke of the piston.

The cylinder 1 is arranged to be mounted in position on the frame of the vehicle by a pair of substantially U-shaped supporting members 47, 48 secured to the outer wall of the cylinder 1 by welding as indicated at 49 and further secured in the same manner to the reinforcing ring 4 as indicated at 50 and to the flange 3 as indicated at 51.

The horizontal portion of each of the supporting members 47, 48, is provided with apertures 52 for accommodating the bolts (not shown) employed for securing the brake cylinder in position.

It will be understood that the cylinder proper 1, the reinforcing ring 4 and the longitudinal ribs 6 are under the pressure of the fluid within the cylinder subject mainly or exclusively to tensile stresses which their form, arrangement, and the material of which they are composed enable them effectively to resist and a cylinder constructed in accordance with the invention is thus in every respect equivalent or superior to a cast metal cylinder as regards strength and rigidity while being of considerably less weight. Furthermore owing to the nature of the material of which the cylinder is composed, there is no liability to crack during construction or in service while waste of material due to defects in a casting disclosed during machining are also eliminated.

As will be apparent from the above description, the reinforcing members for the cylinder head may be formed integral therewith by a pressing operation instead of being welded thereto as above described. In this and other respects the invention is thus not limited to the precise arrangements above described which may be modified to suit different conditions without exceeding the scope of the invention.

Having now particularly described and ascertained the nature of the said invention and in what manner the same is to be performed, I declare that what I claim is:

As an article of manufacture, a brake cylinder having the cylinder proper and its pressure head formed of sheet steel in one piece, a reinforcing ring welded to the outer wall of the cylinder, adjacent to the pressure head, a radial flange formed on the opposite end of the cylinder, and thin sheet steel longitudinally arranged ribs welded to said cylinder and to said ring and flange.

ALOYSIUS G. BRACKENBURY.